US010750470B2

(12) United States Patent
Pattabiraman et al.

(10) Patent No.: US 10,750,470 B2
(45) Date of Patent: Aug. 18, 2020

(54) SYSTEMS AND METHODS FOR DETERMINING IF A RECEIVER IS INSIDE OR OUTSIDE A BUILDING OR AREA

(71) Applicant: NextNav, LLC, Sunnyvale, CA (US)

(72) Inventors: Ganesh Pattabiraman, Saratoga, CA (US); Deepak Joseph, Oakton, VA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 15/952,600

(22) Filed: Apr. 13, 2018

(65) Prior Publication Data

US 2018/0234939 A1  Aug. 16, 2018

Related U.S. Application Data

(63) Continuation of application No. 15/072,831, filed on Mar. 17, 2016, now Pat. No. 9,980,246, which is a
(Continued)

(51) Int. Cl.
*H04W 16/24* (2009.01)
*H04W 64/00* (2009.01)
(Continued)

(52) U.S. Cl.
CPC ......... *H04W 64/006* (2013.01); *G01S 5/0252* (2013.01); *G01S 5/0257* (2013.01);
(Continued)

(58) Field of Classification Search
CPC ..... H04W 4/023; H04W 4/029; H04W 64/00; H04W 64/006; H04W 4/02; H04W 4/027; H04W 64/003
(Continued)

(56) References Cited

U.S. PATENT DOCUMENTS 7,498,985 B1    3/2009  Woo
2005/0197767 A1*  9/2005  Nortrup ............ G01C 21/3667
                                                              701/420
(Continued)

FOREIGN PATENT DOCUMENTS

CN    102209295 A    10/2011
CN    102362531 A    2/2012
(Continued)

OTHER PUBLICATIONS

Chinese Patent Office, Office Action for Chinese Patent Application No. 201810826563.4, including rough English translations of parts of the office action and claims, 25 pages, dated Apr. 10, 2020.
(Continued)

*Primary Examiner* — Fred A Casca (57) ABSTRACT

Determining if a receiver is inside or outside a building or area. Particular systems and methods for determining if a receiver is inside or outside a building determine an estimate of a position of a receiver, and use the estimate of the position of the receiver and other data to determine if the position of the receiver is inside a first building. The other data may include locations of geo-fences inside buildings, heights of buildings, or other types of data.

8 Claims, 5 Drawing Sheets

Related U.S. Application Data continuation of application No. 14/207,210, filed on Mar. 12, 2014, now Pat. No. 9,326,105.

(60) Provisional application No. 61/790,036, filed on Mar. 15, 2013, provisional application No. 61/789,824, filed on Mar. 15, 2013.

(51) Int. Cl.
| | |
|---|---|
| *H04W 4/021* | (2018.01) |
| *H04W 52/02* | (2009.01) |
| *G01S 5/02* | (2010.01) |
| *H04W 4/029* | (2018.01) |
| *H04B 7/06* | (2006.01) |
| *H04B 7/0452* | (2017.01) |
| *H04B 7/0413* | (2017.01) |
| *H04B 7/10* | (2017.01) |
| *H04W 16/22* | (2009.01) |
| *H04B 7/22* | (2006.01) |
| *H04W 16/18* | (2009.01) |
| *H04B 7/12* | (2006.01) |
| *H04W 16/14* | (2009.01) |
| *H04W 16/32* | (2009.01) |
| *H04W 40/00* | (2009.01) |
| *H04W 36/00* | (2009.01) |
| *H04L 5/00* | (2006.01) |
| *H01Q 1/24* | (2006.01) |
| *H04L 1/06* | (2006.01) |

(52) U.S. Cl.
CPC ......... *H04B 7/0413* (2013.01); *H04B 7/0452* (2013.01); *H04B 7/061* (2013.01); *H04B 7/0697* (2013.01); *H04B 7/10* (2013.01); *H04B 7/12* (2013.01); *H04B 7/22* (2013.01); *H04W 4/021* (2013.01); *H04W 4/029* (2018.02); *H04W 16/14* (2013.01); *H04W 16/18* (2013.01); *H04W 16/22* (2013.01); *H04W 16/24* (2013.01); *H04W 16/32* (2013.01); *H04W 52/0209* (2013.01); *H04W 52/0251* (2013.01); *H04W 64/00* (2013.01); *H04W 64/003* (2013.01); *H01Q 1/246* (2013.01); *H04L 1/06* (2013.01); *H04L 1/0668* (2013.01); *H04L 5/0007* (2013.01); *H04W 36/00* (2013.01); *H04W 40/00* (2013.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/26* (2018.01)

(58) Field of Classification Search
USPC .......................................... 455/456.1, 456.3
See application file for complete search history.

(56) References Cited

U.S. PATENT DOCUMENTS

| | | |
|---|---|---|
| 2011/0238301 A1 | 9/2011 | Lee |
| 2011/0238302 A1* | 9/2011 | Lee ................. G01C 21/20 701/408 |
| 2012/0182180 A1 | 7/2012 | Wolf |
| 2013/0093627 A1 | 4/2013 | Cosman |
| 2013/0197857 A1* | 8/2013 | Lu ....................... G01S 19/19 702/141 |
| 2013/0244687 A1 | 9/2013 | Stargardt |
| 2013/0331127 A1 | 12/2013 | Sabatelli |
| 2014/0195454 A1 | 7/2014 | Richie |

FOREIGN PATENT DOCUMENTS

| | | |
|---|---|---|
| CN | 102938927 A | 2/2013 |
| WO | 2012045483 A1 | 4/2012 |

OTHER PUBLICATIONS

United States Patent & Trademark Office, Office Action for U.S. Appl. No. 16/862,426, including claims, 19 pages, dated Jun. 26, 2020.

\* cited by examiner

SYSTEMS AND METHODS FOR DETERMINING IF A RECEIVER IS INSIDE OR OUTSIDE A BUILDING OR AREA

RELATED APPLICATIONS

This application relates to U.S. Patent Application Nos. 61/789,824 (filed Mar. 15, 2013, entitled SYSTEMS AND METHODS RELATING TO ENHANCEMENT OF USER EXPERIENCE USING IMPROVED MOBILE APPLICATIONS AND THREE-DIMENSIONAL LOCATION INFORMATION), 61/790,036 (filed Mar. 15, 2013, entitled SYSTEMS AND METHODS FOR PROVIDING WE-BASED SERVICES USING 3D LOCATION ENVIRONMENTAL AND USER INFORMATION), Ser. No. 14/207,210 (filed Mar. 12, 2014, entitled SYSTEMS AND METHODS FOR USING THREE-DIMENSIONAL LOCATION INFORMATION TO IMPROVE LOCATION SERVICES), and Ser. No. 15/072,831 (filed Mar. 17, 2016, entitled SYSTEMS AND METHODS FOR USING THREE-DIMENSIONAL LOCATION INFORMATION TO IMPROVE LOCATION SERVICES), the contents of which are hereby incorporated by reference herein in their entirety.

FIELD

Various embodiments relate to wireless communications, and more particularly, to networks, devices, methods and processor-readable media for acquiring three-dimensional location information, and using the acquired three-dimension location information to locate users and enhance their experience in relation to location-based services.

BACKGROUND

It is desirable to estimate the position (or "location") of a person in a geographic area with a reasonable degree of accuracy, and to associate that position with nearby places, things and services. Unfortunately, various techniques that estimate the position of a user are often expensive, slow or inaccurate. These shortcomings are pronounced in urban environments, where estimating the position of a person is difficult due to many challenges that must be overcome to deliver cost-effective and reliable position estimates. Even if cheaper and more reliable technologies are used, the scarcity of information regarding the locations of places, things and services, relative to the person, presents additional problems in urban environments. Accordingly, there is a need for improved techniques for estimating a position of a person, and for collecting assistance data that can be used with the position estimate to connect that person to a place, thing or service.

DESCRIPTION

Overview of System

Figure 1:
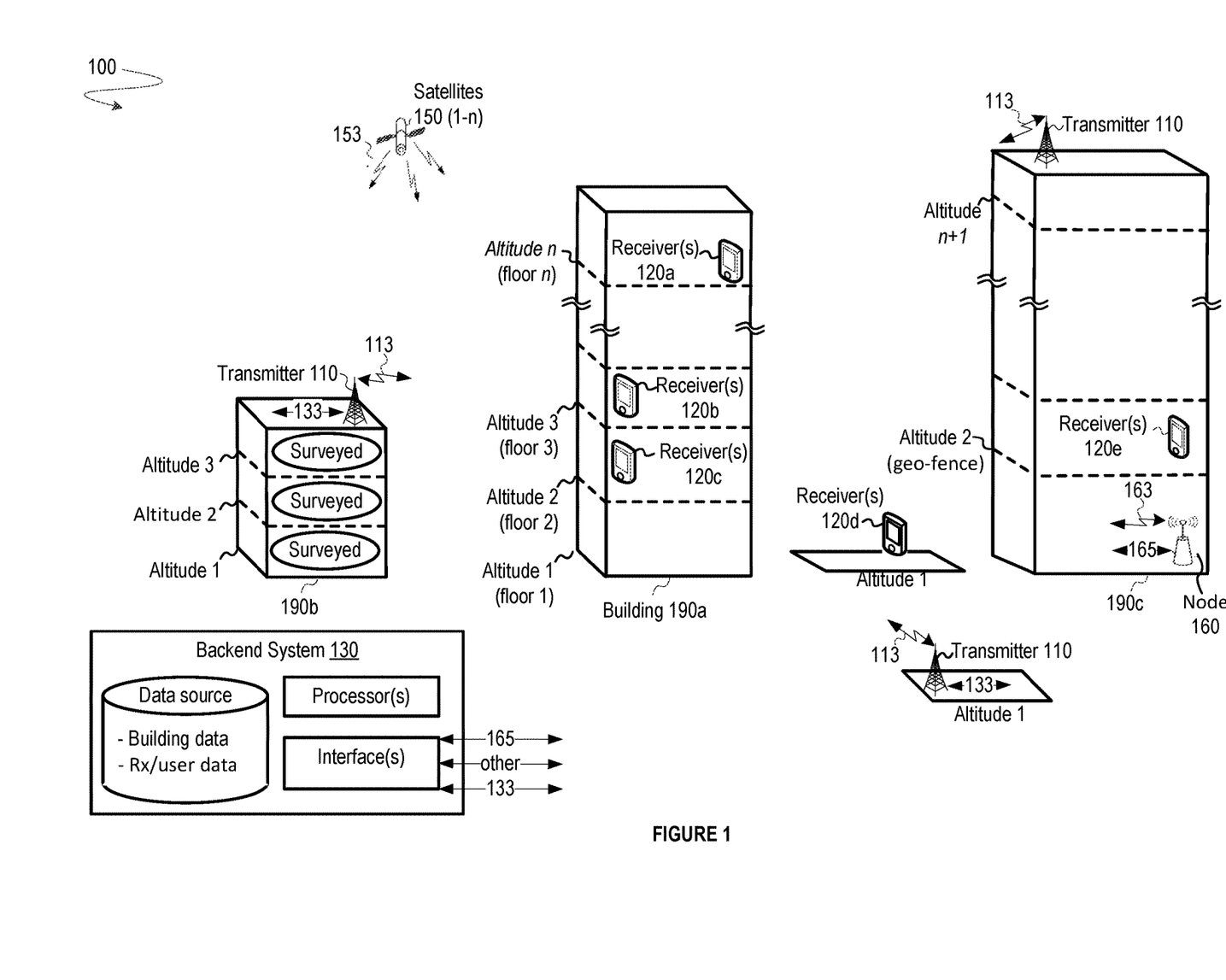
FIG. 1 depicts a positioning environment within which embodiments are implemented.

FIG. 1 illustrates a positioning environment 100 within which various embodiments disclosed herein may be implemented. The environment 100 includes a wide area network of synchronized transmitters 110 (also denoted herein as "beacons"), which are depicted as terrestrial, as well any number of receivers 120 configured to acquire and track signals provided from the transmitters 110, a network of satellites 150, or another network node 160 (e.g., cellular, Wi-Fi, Ethernet, other communication network).

The environment 100 may further include a backend system 130 that communicates with various other systems, such as the transmitters 110, the receivers 120, and the other networks (e.g., the network node 160). The backend system 130 may include one or more processor(s), data source(s), interfaces and other components (not shown).

Components of the backend system 130 and the other systems (e.g., transmitters 110 and receivers 120) may be geographically distributed from one another in different neighborhoods, cities, counties, states, countries, or other types of regions, such that the receiver 120 receives signals from the transmitters 110 in one location, and at least some of the processing related to those signals is carried out by the backend server 130 in another location. It is noted that processing at one system (e.g., the transmitter 110, the receiver 120, or the backend system 130) may be initiated by signals received from another one of those systems.

Various receivers 120a-e are depicted at various altitudes 1-n. Of course, the environment 100 may be configured to support more receivers and more altitudes (or depths below some reference altitude). Each receiver 120 may include a processor (e.g., the processor 210 shown in FIG. 2) that determines position information based on signals received from the transmitters 110 or other networks (e.g., the satellites 150, the node 160). Once known, the position information may be used to estimate the position of the receiver 120 in terms of Latitude, Longitude and Altitude (LLA).

Various techniques are used to estimate the position of an receiver, including trilateration, which is the process of using geometry to estimate a location of the receiver using distances (or "ranges") traveled by different "ranging" signals that are received by the receiver from different transmitters (or antennas when using a multi-antenna configuration). If the time of transmission of a ranging signal from a transmitter and the reception time of the ranging signal are known, then the difference between those times multiplied by speed of light would provide an estimate of the distance traveled by that ranging signal. These estimates are often referred to as "range measurements". In most cases, the range measurements are not equal to the actual ranges (i.e., shortest distances) between transmitters 110 and the receiver 120, mainly because signals reflect off of objects (e.g., walls and other structures of buildings 190) that are disposed between or near the transmitters 110 and the receiver 120. Consequently, the estimate of the receiver's position does not necessarily overlap the actual position.

The receivers 120 may receive signals from and/or send signals to the transmitters 110, the satellites 150 and the network node 160 via corresponding communication links 113, 153 and 163. Communication connectivity between a receiver 120 and other systems (e.g., the backend system 130) may be carried out using wired means (e.g., Ethernet, USB, flash RAM, or other similar channels as is known or later developed in the art), or wireless means (radio frequency, Wi-Fi, Wi-Max, Bluetooth, or other wireless channels as is known or later developed in the art).

The transmitters 110 may be configured to transmit signals that are received by any of the receivers 120, and to communicate with the backend system 130 via communication links 133. In some embodiments, the transmitters 110 may transmit signals using one or more common multiplexing parameters—e.g. time slot, pseudorandom sequence, or frequency offset. Each signal may carry different information that, once extracted, may identify the transmitter that transmitted the signal, ranging information that is used to measure a distance to the transmitter, and other information.

By way of example, various aspects that relate to signaling and positioning of a receiver based on signaling from transmitters, in a wide area network of transmitters are described in co-assigned U.S. Pat. No. 8,130,141, issued Mar. 6, 2012, entitled WIDE AREA POSITIONING SYSTEM, and co-assigned U.S. patent application Ser. No. 13/296,067, filed Nov. 14, 2011, published as 2012/0182180 on Jul. 19, 2012, and patented as U.S. Pat. No. 9,057,606 on Jun. 16, 2015, entitled WIDE AREA POSITIONING SYSTEM, which are incorporated by reference herein in their entirety and for all purposes, except where their content conflicts with the content of this disclosure.

Figure 2:
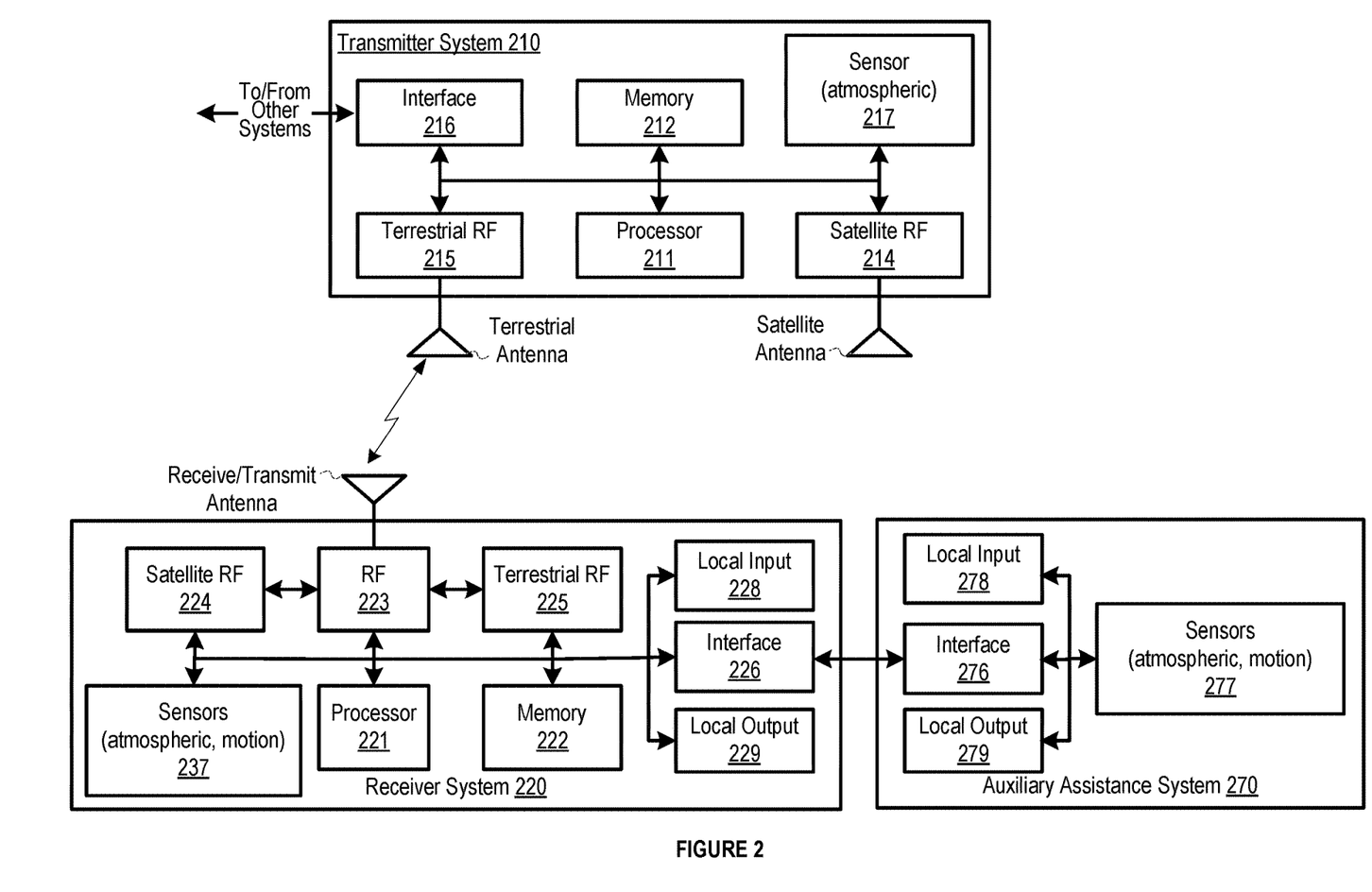
FIG. 2 depicts aspects of receiver, transmitter and auxiliary assistance system 270.

FIG. 2 illustrates details of a receiver system 220, at which signals from transmitters may be received and processed to extract information used to compute an estimated position of the receiver system 220. The receiver system 220 may include any of a variety of electronic devices configured to receive RF or other signaling using wireless means (radio frequency, Wi-Fi, Wi-Max, Bluetooth, or other wireless channels as known or later developed in the art), or wired means (e.g., Ethernet, USB, flash RAM, or other similar channels as known or later developed in the art). Each receiver system 220 may be in the form of a cellular or smart phone, a tablet device, a PDA, a notebook or other computing device. It is noted that User Equipment (UE), Mobile Station (MS), User Terminal (UT), SUPL Enabled Terminal (SET), Receiver (Rx), and Mobile Device may be used to refer to the receiver system 220. As shown, RF component 223 may control the exchange of information with other systems (e.g., satellite, terrestrial). Signal processing may occur at a satellite component 224, or a terrestrial component 225, which may use separate or shared resources such as antennas, RF circuitry, and the like. One or more memories 222 may be coupled to a processor 221 to provide storage and retrieval of data and/or instructions relating to methodologies described herein that may be executed by the processor 221. The receiver system 220 may further include one or more sensors 227 for measuring environmental conditions like pressure, temperature, humidity, acceleration, direction of travel, wind force, wind direction, sound, or other conditions. The receiver system 220 may further include input and output (I/O) components 228 and 229, which may include a keypad, touchscreen display, camera, microphone, speaker, or others, which may be controlled as known in the art. It is noted that the receiver system 220 may be implemented by the receivers 120 described herein, which may alternatively take on other forms as known by one of skill in the art.

FIG. 2 further illustrates details of a transmitter system 210 at which signals may be generated and transmitted. The transmitter system 210 may include a processor 211 that carries out signal processing (e.g., interpreting received signals and generating transmission signals). One or more memories 212 may provide storage and retrieval of data and/or executable instructions for performing functions described herein. The transmitter system 210 may further include one or more antenna components (e.g., a satellite antenna or terrestrial antenna) for transmitting and receiving signals, a satellite RF component 214 for receiving satellite signals, from which location information and/or other information (e.g., timing, dilution of precision (DOP), or other) may be extracted, a terrestrial RF component 215 for receiving signals from a terrestrial network, and/or for generating and sending output signals, and an interface 216 for communicating with other systems. The transmitter system 210 may also include one or more environmental sensors 217 for sensing environmental conditions (e.g., pressure, temperature, humidity, wind, sound, or other), which may be compared to such conditions as sensed at a receiver in order to estimate a position of the receiver based on similarities and differences between the conditions at the transmitter system 210 and the receiver. It is noted that the transmitter system 210 may be implemented by the transmitters described herein, which may alternatively take on other forms as known by one of skill in the art. Each transmitter system 210 may also include various elements as are known or later developed in the art for sending/receiving signals to/from the antennas, including analog or digital logic and power circuitry, signal processing circuitry, tuning circuitry, buffer and power amplifiers, and such.

Other components in FIG. 2 are described later in relation to particular embodiments.

Overview of Various Embodiments

Various embodiments relating to the use of two-dimensional (2D) or three-dimension (3D) position estimates to improve location services may be implemented in the environment 100. Certain embodiments, which are disclosed in further detail below, include: 3D location detection in outdoor and indoor environments; a user interface for providing a map that auto-rotates on a screen of a receiver depending on the heading of the receiver in an environment; cues provided to a user when navigating through an environment using a map displayed on a screen of a receiver; indoor map loading at an accurate floor level based on the position estimate; enabling/disabling applications based on position estimate; enhancing/filtering estimates of a receiver's position (also referred to herein as a "position estimate" or "position fix") using sensor measurements (e.g., measurements of motion); estimating heights of floors, things or places in a building using crowd-sourced altitudes from position estimates; determining if a receiver is inside or outside of a building; using data corresponding to buildings in urban environments (e.g., address, reverse geo-code, height, number of floors, heights of floors, atmospheric conditions, information relating to places/things inside the building, and other measurable or quantifiable information); providing indoor and outdoor location services relating to a user's 3D location, which may be particularly useful for a range of location services (e.g., mapping of unknown characteristics of environments, providing navigation, finding things, sending targeted advertising). Various enhancements to mobile applications using position estimate are described in further detail below.

User Interface (UI) with Map Application Auto-Rotate Feature

Various location services allow map applications to plot a user's current location on a displayed map. Many of these map applications fail to help users navigate outdoor or indoor environments by providing mapped information along a heading direction of the user. Maps presented in known user interfaces are usually oriented in a fixed direction, which can disorient a user when the direction of the user's heading does not align with the orientation of the map. Unfortunately, the user often must manually rotate his or her phone.

These problems are solved by tracking position estimates over time to determine a direction of travel, and/or by confirming or modifying that direction of travel using sensed motion. Once a direction of travel is known, an orientation of a map can be auto rotated on a screen (with suitable manual override to disable this feature) such that the map orientation on the screen is matched to the direction of heading. Motion may be sensed in various ways, including by inertial sensors (e.g., gyroscopes, accelerometers, compasses, and other sensors configured to determine orientation, direction of travel and speed of travel). Other components may also be used to "sense" motion relative to some local area transmission component at known locations (e.g., RFID sensors, local area beacons, and the like), where reception of signals between a receiver and transmission component(s), strength of signals and/or trilateration using multiple the signals from multiple transmission components can be used to determine the direction of a user's heading as the user approaches or moves away from those transmission components.

Auto-Rotation

Figure 3A:
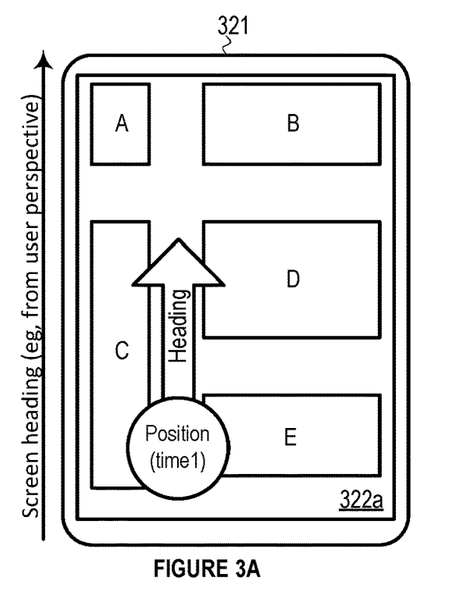
FIG. 3A and FIG. 3B illustrate a user interface at during operation of an auto-rotation process.
Figure 3B:
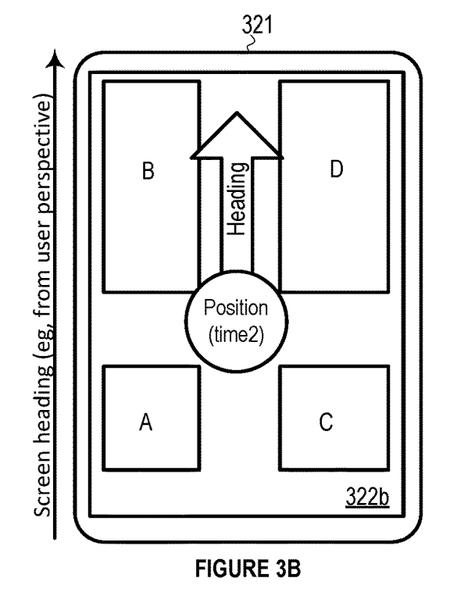
Figure 4:
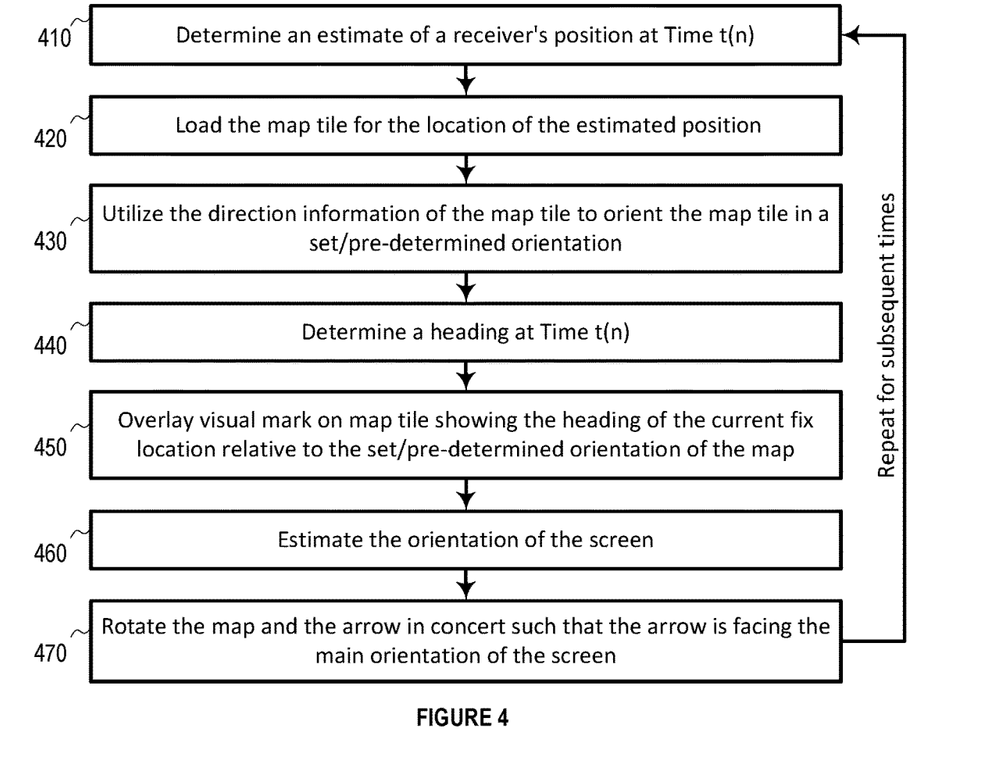
FIG. 4 depicts an auto-rotation process.

FIGS. 3A-B and FIG. 4 illustrate an auto-rotation process. FIGS. 3A-B depict a screen 321 that displays maps 322a and 322b at two instances in time (e.g., Time 1 and Time 2). FIG. 4 illustrates a process for determining how to display the maps 322a-b at the two times. An estimate of a receiver's position at time t(n) is determined (410). A map tile for the location of the estimated position is loaded (420). Direction information of the map tile (e.g., map information direction layer) is used to orient the map tile in a set/pre-determined orientation (430). For example, the map tile may be oriented in a northern direction. A heading at time t(n) is determined (440). For example, a heading may be determined using position estimates between times t(n) to t(n−k), where k can be any number (e.g., 10 position estimates). A compass direction may also be used. Additional details regarding how a heading may be determined are provided later. A visual mark (e.g., an arrow) may be overlaid on the map tile in the direction of heading on the current position estimate relative to the set/pre-determined orientation of the map (450). The orientation of the screen may be determined (e.g., landscape/portrait) (460). Then, the map and the arrow are rotated in concert such that the arrow is facing the main orientation of the screen (470). Operations 410-470 may be repeated for heading and position estimates at subsequent times.

Of course, there are other ways to determine how to display the maps 322a-b. At the first instance in time (Time 1), an estimate of a receiver's position and a heading are determined. The location of the position estimate in a geographic area is then determined, and a map corresponding to that location in the geographic area is identified. Orientations of the map relative to the heading and a screen of the receiver relative to heading are then determined. Finally, the map is displayed on the screen such that the orientations of the map and the screen align along the heading. The previous operations may be repeated for heading and position estimates at subsequent times (Time 2).

Heading

The heading may be determined using various techniques, where the heading may be provided to a map application that performs the auto-rotation method from above. The heading may be absolute (e.g., based on Northern, Eastern, Southern and Western directions) or relative (e.g., directionally relative to a past, current or future location on a map). The heading may be computed by a processor (e.g., the processor of the backend system 130 in FIG. 1, or the processor 410 of FIG. 4), and various applications may access the computed heading (e.g., via SDK that an application developer may obtain from a network operator).

In one approach, consecutive position estimates are determined over a period of time. The heading may be computed by accumulating a set of position estimates (e.g., ten previous position estimates) using corresponding pseudo-ranges to create a time-sequenced location vector. The changes in pseudo-ranges that correspond to the same transmitter may be determined, and relative changes may be evaluated (e.g., where decreases or increases in range towards a transmitter will result in a "direction vector" corresponding to that transmitter). Since the location of the transmitter is known, the processor (e.g., a position engine) uses the location of the current position estimate, along with the locations of the transmitters and their direction vectors, to determine an angle/direction of heading relative to each transmitter. The headings for each transmitter may then be combined to determine an overall heading. Additional sensor inputs may also be used (e.g., measurements from a compass, an accelerometer, a gyroscope and/or other inertial sensors) to fine tune the heading. Once the heading is determined, a message that includes the heading may be generated and sent to different applications.

Cues to External Device

Mobile applications work well in stationary environments where the user can give the screen their full attention, however mobile applications do not work well when the user is in motion and taking cues from or otherwise reacting to the physical and virtual environment around the user. When a user is "on the move", it may be far better for the user to get complementary cues from the receiver (e.g., the receiver system 220 of FIG. 2). Such outputs may include visual outputs (e.g., video or pictures via display, changing states of lights), haptic outputs (e.g., via vibration), and audio outputs (e.g., via speaker) at the receiver—e.g., from the local outputs 229 shown in FIG. 2. Alternatively, such outputs could emit from an auxiliary assistance system 270 (see FIG. 2) as further described below.

As shown in FIG. 2, the receiver system 220 may be connected to an auxiliary assistance system 270 such as a watch, goggle, wrist band, or other device. The connection may be over a short range communication link such as Bluetooth, Zigbee, a cord or other link, and may be automatic or user-activated. Once connected, an application may be launched on the receiver system 220, and important cues may be sent to the auxiliary assistance system 270 through respective interfaces 226 and 276. Alternatively, information may be collected at the auxiliary assistance system 270 (e.g., using sensors 277) and sent to the receiver system 220 for processing and cue generation.

One embodiment relates to a navigation application where the user gets routed from point A to point B. In this scenario, the receiver system 220 and auxiliary assistance system 270 establish a connection, and the receiver system 220 launches a navigation application at point A. The receiver system 220 then generates signals that are intended to control some output from the receiver system 220 or the auxiliary assistance system 270 to provide information/cues to the user (e.g., direction from point A to B with respect to obstructions between the points, location of other users or places of interest along one or more potential pathways between point A and point B, and the like). Such cues may take the form of audio cues, visual cues or haptic cues indicating turns. This allows the user to navigate without looking at the receiver system 220 or the auxiliary assistance system 270. The auxiliary assistance system 270 may also receive indications about other receiver notifications (e.g., received call, email, SMS).

Indoor Map Loading at Correct Floor Level

In accordance with certain aspects, an indoor location service allows map applications to plot a user's current location on an indoor map. However, indoor maps of many buildings have multiple floors and the user typically has to manually select the floor level to view the correct map of the floor in which they are present. Instead of manual selection, an altitude of a position estimate can be used to look up a floor level in a database that has the mapping of each floor level. Then, after identifying the floor level, an appropriate map corresponding to that floor may be loaded with appropriate manual overrides in case the user wants to see the map of another floor of the building. The building identity for the floor-level matching may be performed by reverse geocoding the position estimate that includes latitude and longitude.

Figure 5:
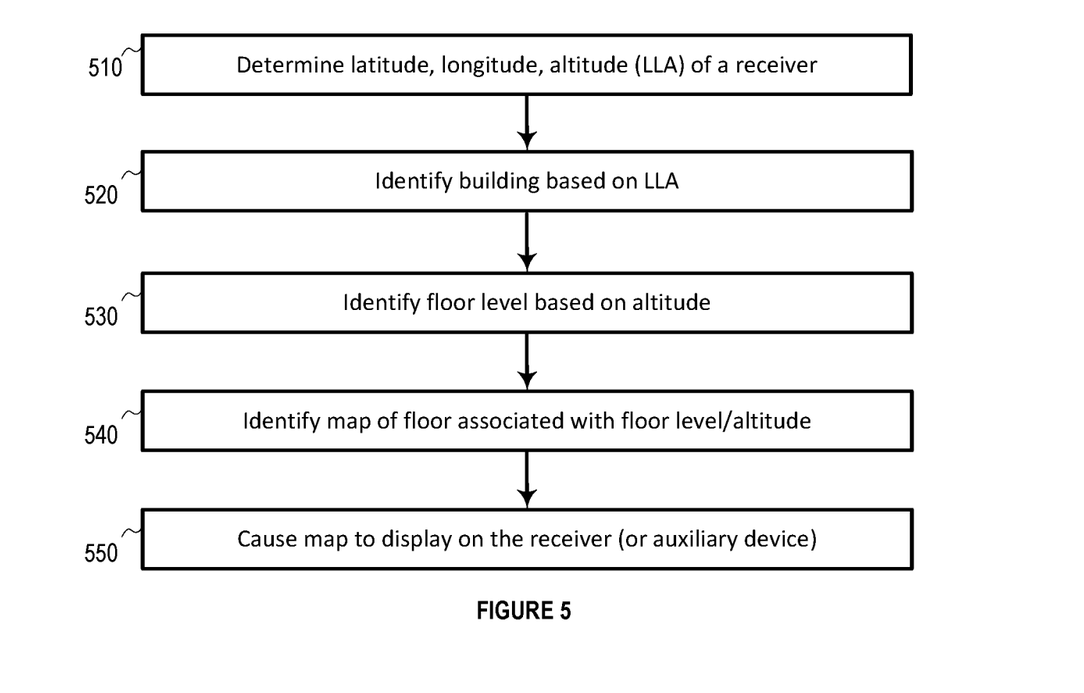
FIG. 5 depicts a method for identifying a map corresponding to a floor of a building.

By way of example, FIG. 5 depicts a method for identifying a map corresponding to a floor level of a building. Initially, the latitude, longitude and altitude (LLA) of a receiver is determined (510). Based on the LLA, the building is identified from among other buildings (520). The building may reside at or near the latitude and longitude, and may have a height that is at least as high as the altitude. Optionally, a floor level of the building is determined based on the altitude (540). Each floor level in the building may be associated with a particular height, which can be looked up in a database. A map of a floor that corresponds to the floor level/altitude may be accessed and later displayed on an output of the receiver (or auxiliary assistance system 270) (550).

Enabling/Disabling Applications Based on Indoor 3D location

Three dimensional position estimates can be used by software applications (e.g., MDM services) of a receiver to control that receiver. For example, such applications may enable/disable specific functions based on a comparison of the receiver's estimated position and three-dimensional or two-dimensional geo-fences that specify rules that control operations of the receiver when it resides in the geo-fenced area. A remote server may send, to each application on the receiver, appropriate permissions to either be enabled or disabled based on the position estimate of the receiver relative to the geo-fence. It is understood that other location technology can also be used to track the estimated position of the receiver relative to the geo-fence.

In an enterprise setting, specific access to data by certain applications can be enabled or disabled based on the receiver's location within the enterprise (e.g., a particular area of a floor in an office building). This can allow enterprises to ensure that sensitive data may be accessed on devices only when they may be within certain areas of the office/floor/building. It can also be used to turn off power-hungry applications when features of those applications are unusable at the user's current location. Similarly, entry into a geo-fenced area may permit a receiver to access information that is otherwise unavailable (e.g., sensitive, marketing, or other information).

Figure 6:
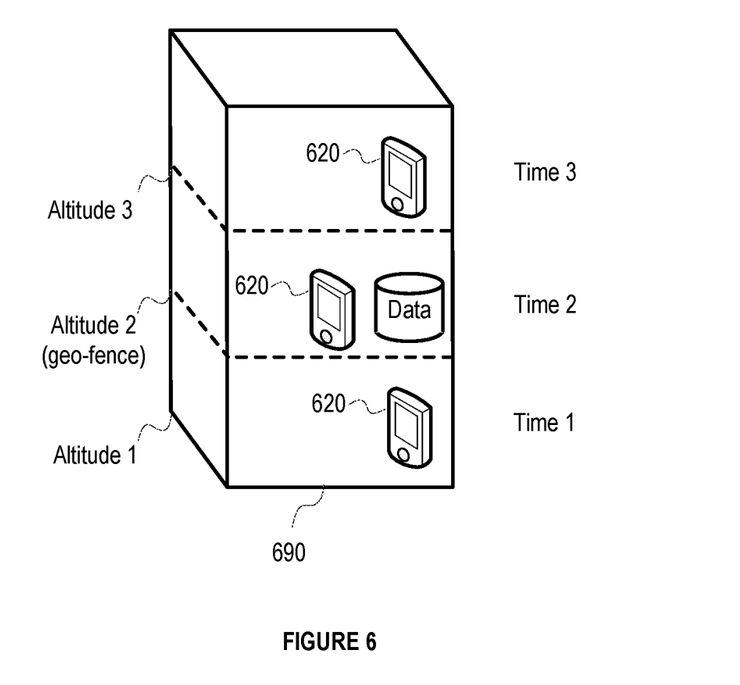
FIG. 6 depicts positions of a receiver relative to a geofence different times.

By way of example, FIG. 6 depicts positions of a receiver 620 relative to a geo-fence at Time 1, Time 2 and Time 3 in a building 690. As shown, the receiver 620 moves from a first altitude at Time 1, to a second altitude at Time 2 (at which a geo-fence is established), and eventually to a third altitude at Time 3. At Time 1 and Time 3, the receiver 620 may operate in a first state (e.g., software application may run, data is not accessible). At Time 2, the receiver 620 may operate in a second state (e.g., software application may not run, data is accessible).

Filtering Position Estimates Using Other Sensor Input at a Receiver

In many location services, like GPS, one of two consecutive position estimates may be inaccurate. Occasionally, one of the consecutive position estimates can land quite far off from the receiver's location. In some cases, the two position estimates are different even though the receiver has not moved. Thus, it would be helpful to determine which of the two position estimates are inaccurate, which can be achieved using a software application that uses input from other sensors on the receiver to estimate if the receiver has actually moved a distance separating a first position estimate and a second position estimate. The distance may be computed by comparing latitude, longitude and altitude of the two position estimates. Movement by the receiver may be detected by any number of means that are known in the art, including inertial sensors that track motion in terms of direction and speed (e.g., accelerometers, gyroscopes and others). The distance moved (as sensed by the sensors) can be compared to the distance separating the first and second position estimates. Of course, a similar approach may be taken to with more than two position estimates.

In one embodiment, a filters and thresholds are used to estimate if a subsequent position estimate is accurate. For example, when a threshold distance between consecutive position estimates is reached (e.g., 5 meters, 10 meters, 50 meters or some other distance that is dependent on precision required by a location service), a software application checks measurements from a sensor at the receiver to determine if the receiver moved, and to determine if the receiver moved the threshold distance or if the amount of movement is within some threshold value of the difference between the two position estimates. If movement over the threshold distance has occurred, or if the amount of movement is within the threshold value of the difference, then the second position estimate may be used as current location of the receiver. If the sensor input indicates that the movement over the threshold distance has not happened, or if the amount of movement is not within the threshold value of the difference, then the second position estimate may be discarded, and the current location may not be changed/updated from the first position estimate.

Figure 7:
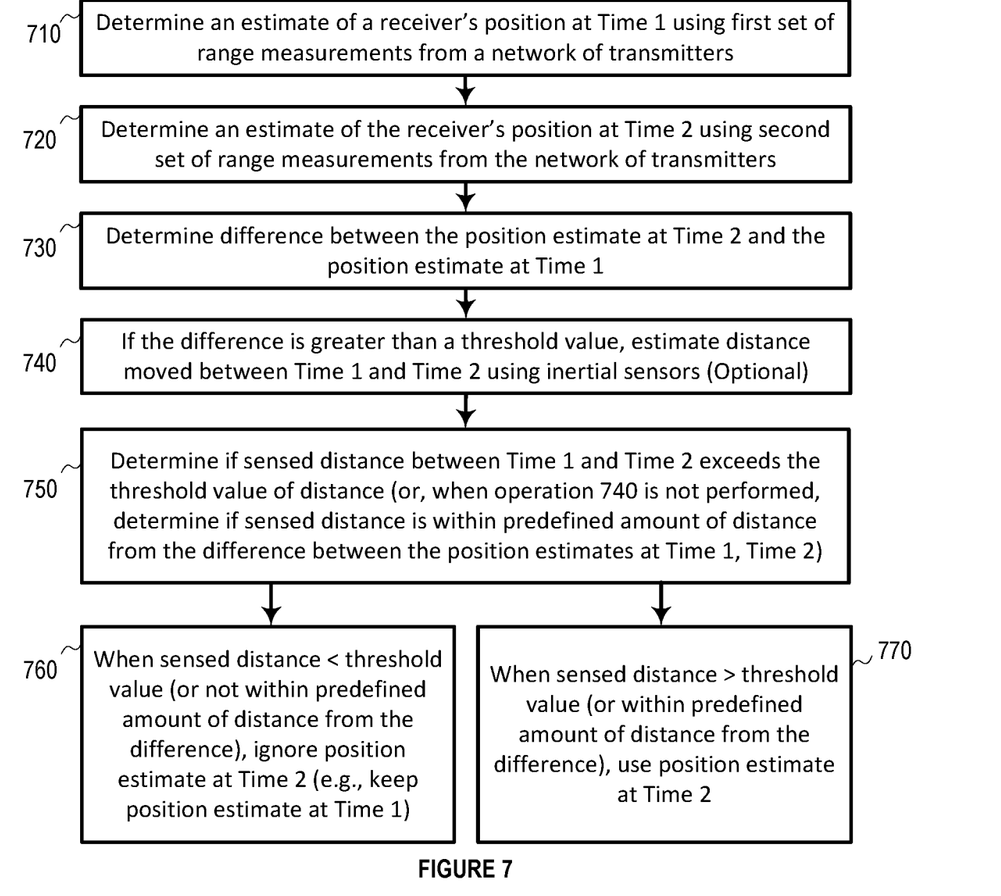
FIG. 7 depicts a method for confirming the accuracy of a position estimate.

By way of example, FIG. 7 depicts a method for using sensed movement to confirm whether a position estimate is accurate. At a first instance in time, a first estimate of a receiver's position is determined using a first set of range measurements from a network of transmitters (710). At a second instance in time, a second estimate the receiver's position is determined using a second set of range measurements from the network of transmitters (720). The difference between the first and second position estimates is measured in terms of magnitude and direction (730). In some embodiments, the measured distance is compared to a threshold value of distance to determine if the difference is greater than the threshold value. When the distance is greater than the threshold value, a measurement of distance moved between Time 1 and Time 2 is estimated using inertial sensors of the receiver by means known in the art (e.g., tracking velocity, which has magnitude and directional components) (740). In alternative embodiments, the comparison of the difference to the threshold value may be skipped, but the sensed measurement of distance moved between Time 1 and Time 2 is still estimated. The sensed distance may be compared the threshold value of distance, or to the difference between the position estimates at Time 1 and Time 2 (750). When the sensed distance is less than the threshold value or not within a predefined amount of distance from the measured difference, the second position may be ignored (760). When the sensed distance is greater than the threshold value, or within the predefined amount of distance from the measured difference, the second position may be used (770). Of course, a similar approach may be used to identify the first position estimate as inaccurate, and a similar approach may be used to identify one of three or more position estimates as inaccurate Application to Crowd-Source Elevation to Floor-Level Data Mapping Attention is now drawn to FIG. 1 to illustrate aspects of the following disclosure related to crowd-sourced mapping of floor levels in a building (e.g., the building 190*a* with n floors designated by n altitudes). It is to be understood that discussion related to mapping of floor levels may extend to mapping of anything at different heights within a building— e.g., locations of places like businesses, and locations of things like objects or people—where the heights are associated with those places or things. It is also noted that similar mapping may be made in relation to latitude and longitude.

One approach to mapping heights is to manually measure each building to find out the height of each floor in a building. This is usually accomplished with a tape measure or other measurement tool. While this method may be accurate in capturing the elevation to floor-level mapping, it may be time consuming and labor intensive. An easier method is to map individual floor levels (or things/places) using crowd-sourced altitude computations associated with different positions of receiver(s). The altitudes may be stored in the data source of the backend system 130, and the processor of the backend system 130 may map particular altitude values, usually in meters (Height Above Ellipsoid or Mean Sea Level), to particular floors of a building 190. Various methods for estimating the altitude of a receiver are known, including those methods discussed in U.S. patent application Ser. No. 13/296,067, filed Nov. 14, 2011, published as 2012/018218 on Jul. 19, 2012, and patented as U.S. Pat. No. 9,057,606 on Jun. 16, 2015, entitled WIDE AREA POSITIONING SYSTEM, which is incorporated by reference herein in its entirety and for all purposes. In addition to altitude, estimates of the receiver's latitude and longitude coordinates may be recorded and used to identify the building within which the receiver resides. Alternatively, the building may be identified when the presence of the receiver in the building is detected (e.g., as it passes through a geo-fence of the building). Yet another approach to determine that the receiver is in a building is to compare the estimated altitude to maximum height of buildings, and ignore buildings with heights below that altitude. One of skill in the art will appreciate other approaches for determining that a receiver is in a particular building.

In some embodiments, the user may be also asked to input, into the receiver, the floor level at which that user resides. The floor level may then be correlated to the altitude that is computed for that receiver. The building's reverse geocoded address may also be determined based on user input or based on the latitude and longitude of the estimated position. Data collected or otherwise determined at the receiver may be sent to a remote database for storage (e.g., the data source at the backend system 130), thus enabling later use of the stored data.

In one embodiment, once at least two or more corroborating readings for approximately the same LLA are obtained, then a mapping of the altitude to a particular floor level of a particular building may be used for reference by other applications. The floor-level-to-altitude mapping data can also be given a confidence level based on the amount of corroborating data.

In some embodiments, multiple altitude computations from the same receiver or multiple receivers may be determined over time (e.g., altitudes corresponding to receivers 120*a-c* in FIG. 1, or altitudes corresponding to the receiver 120 in FIG. 6). Groups of computed altitudes that that cluster together (e.g., within 1 meter of each other) may corroborate an assumption that those altitudes are associated with the same floor in a building. Floor heights for a building may then be inferred from the altitudes for different groups.

In some cases, altitudes for different groups may be compared to assign altitudes to particular floors. For example, if computed altitudes include 0 meters, 3 meters, 6 meters, 9 meters and 12 meters, as reported at the server from multiple receivers and over multiple days for the same building, it may be determined that the building includes at least 5 floors with separation of 3 meters between floors.

It may also be determined that certain heights corresponding to certain floors have not been collected, as may be determined when computed altitudes in ascending order are not separated by approximately the same distance (e.g., within 1 meter of the most common distance of separation between altitudes or an average distance of separation between altitudes). Under this scenario, heights and floors may be inferred by the shortest distance separating two groups. For example, if the computed altitudes include 0 meters, 3 meters, 6 meters, 9 meters, 15 meters and 21 meters, then 12 and 18 meters may be assigned to fifth and seventh floors, respectively, and the computed altitudes may be assigned to the other floors (e.g., 0, 3, 6, 9, 15 and 21 meters to floors 1, 2, 3, 4, 6 and 8). Using FIG. 1 as an illustration, altitudes of the receivers 120*a*, 120*b* and 120*c* in the building 190*a* may be mapped to floors n, 3 and 2, respectively. However, the altitudes for floors between floor 3 and floor n may not be known. Since the difference between floors 2 and 3 is known, and the distance between floors 1 and 2 may be determined using knowledge of street-level altitude to infer the altitude of the first floor, the most common separation between floors can be determined, and used to infer the heights of floors between floor 3 and floor n.

Over time, adjustments may be made as additional altitude computations are received. For example, if at a first instance of time, the computed altitudes include 0 meters, 6 meters, 12 meters and 18 meters, then it may be inferred that the building has at least four floors that are separated by at least 6 meters. However, once a computed altitude of 3 meters is received, then the assumed heights of floors may be adjusted to 3 meters, and the number of floors may be set at 7 floors or more. With reference to FIG. 1 as an illustration, using only altitudes of the receivers 120*a* and 120*b* may result in an initial assumption that each height between the floors in the building 190*a* is no more than the difference between altitude 3 and altitude 1, instead of the difference between altitude 2 and altitude 1 or altitude 3. However, once the altitude of receiver 120*c* is received, the initial assumption may be adjusted such that the height between the floors in the building 190*a* is based on the difference between altitude 2 and altitude 1, and/or the difference between altitude 2 and altitude 3.

Inaccurate assumptions of floor height may also be detected and refined. If computed altitudes include 0 meters, 3 meters, 7 meters, 9 meters and 12 meters, it may be determined that the 7 meter height of the third floor is inaccurate, and the height of the third floor may be adjusted to 6 meters since the average difference in heights between neighboring floors is close to 3 meters. One way of detecting an inaccurate height involves a calculation of the average separation between neighboring floor levels, or the most common separation between neighboring floors. The computed separation can then be compared against separation between different pairs of floors, and adjustments may be made when the separation between two pairs of floors is greater or less than the computed separation by some threshold amount (e.g., 0.5 meters). Also, amounts of separation below and above a floor may be compared, and the average of those two amounts may be used to adjust the height of the floor so that the separation amounts below and above the floor are equal. Thus, the 7 meter height is adjusted to 6 meters.

In some cases, a confidence level is associated with a height assigned to a floor, or to amounts of separation between floors. The confidence level can be related to the number of computed altitudes that have been collected for a particular range of heights, where the greater number of collected heights produces a higher level of confidence. Referring back to the previous example, the confidence level for 7 meters may be low when an amount of heights that have been collected fall below a threshold number, which may explain why the height is 7 meters, not 6 meters. By comparison, the confidence levels for 3 meters and 9 meters may be high when greater than the threshold number of heights have been collected. Under such circumstances, it may be determined that the 7 meter height of the third floor is more likely to be inaccurate than the other heights corresponding to other floors based on the confidence levels for each height/floor. Amounts of separation below and above the 7 meter height may also be associated with a low confidence value, at which point those amounts of separation may be weighted less than other amounts of separation when a weighted average of separation between neighboring floors is determined.

Of course, additional sources of information may be used, including public records that specify numbers of floors, and user information that associates a floor number to a venue on that floor (e.g., an employee or customer of a business on a particular floor). The additional sources of information may be used to further refine estimated heights of floors. Also, using corroborated groupings of altitudes is not required, and single altitude estimates may be used.

Figure 8:
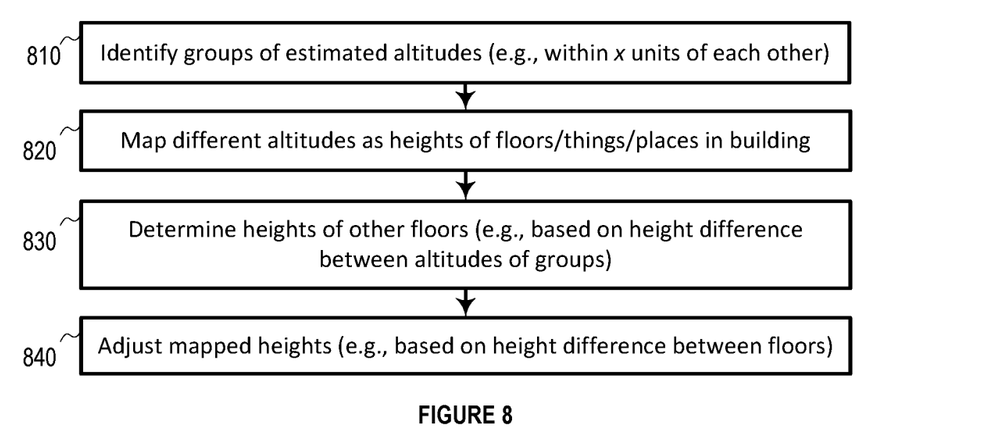
FIG. 8 depicts a method for crowd-sourcing altitude estimates to map heights of floors.

By way of example, FIG. 8 depicts a method for crowdsourcing altitude estimates for the purposes of mapping floors, things, or places in buildings to those altitudes. Initially, groups of estimated altitudes are identified (810). For example, a group may be formed by estimated altitudes that are within x units of each other (e.g., 1 meter). A height corresponding to each group may be identified (e.g., by performing a mathematical operation on the group of estimated altitudes, like computing an average or determining the most common altitude). Each group height may be mapped to different floors, things, or places in building (820). The mapping may relate different heights to each other. For example, a difference between floors in a building may be identified as the most common difference in height between consecutive heights. Input that identifies the floor level may alternatively obtained from a user of the device, or by determining that receivers in a group are within range of a local beacon that is located at that floor level (e.g., the network node 160 in FIG. 1). Once heights of certain floors are known, the heights of other floors can be estimated when no group altitudes are available (830). For example, the heights may be determined based on height differences between other floors, where the height difference is projected up or down from mapped heights. Mapped heights may also be adjusted (840). For example, where a mapped height is not at an expected height, that mapped height may be adjusted to be closer to or at the expected height. The expected height may be determined in a similar manner as the estimated floors from operation 830.

3D Inside/Outside Location Detection

Using position estimates alone may make it difficult to programmatically determine if the receiver/user is within a building, outside a building, or at an adjacent building. This is partly because position estimates are often inaccurate by some amount of distance from the true position of a receiver. However, assistance information may be used along with the position estimate to determine a likelihood that the receiver's true position is inside a building, outside a building, or in an adjacent building. The same is true of determining a likelihood that the receiver's true position is inside a particular area of a building, outside that area, or in an adjacent area. Such determinations are particularly advantageous for large buildings with many areas (e.g., shopping malls), small neighborhoods, and the like. For simplicity, discussion below is provided in relation to building(s). However, the discussion extends to area(s) within a building, area(s) within a neighborhood, or area(s) within some other localized area.

Certain embodiments use a method to determine if a receiver is within a building (e.g., the receiver 120*c* inside the building 190*a*), if a receiver is just outside the building (e.g., the receiver 120*d* outside the building 190*a*), or if a receiver is in an adjacent building (e.g., the receiver 120*e* in the building 190*c*). The location may be determined based on a current position estimate of the receiver and assistance information associated with the building(s), as accessed from a data source (e.g., from the backend system 130).

Determining the location of the receiver, relative to a building or buildings, may be accomplished by the use of a SDK and API at the receiver. The SDK obtains the current position estimate of the receiver. The SDK uses a standard-defined API to send the current position estimate and, if available, a unique identifier of a detectable area within a building (e.g., a venue, floor, and the like) to a remote server (e.g., the backend system 130). The remote server responds to the SDK via the API in a standard data structure to indicate if the position estimate is within the building, outside the building, or at an adjacent building. Reverse geocode information corresponding to the building(s) may also be provided.

When a three-dimensional position estimate is sent to a remote server via a standard API, the remote server compares that position estimate against a set of pre-built 3D geo-fences for a building (e.g., maximum geographical boundaries of the building or areas inside the building in terms of latitude, longitude and altitude). By way of example, a geo-fence at altitude 2 in building 190c is shown in FIG. 1. A programmable parameter related to a relative distance of the position estimate to the pre-built geo-fence can be used to determine if the position estimate is in the building (e.g., the building 190c), in an adjacent building (e.g., the building 190a), or outside those buildings. Such a parameter may include a threshold amount of distance that is compared to the relative distance.

Relative distances from multiple beacons/geo-fences in neighboring buildings may be used to determine if a receiver is more likely to be in one of the buildings or in between the buildings. For example, if the position estimate is closer to a first geo-fence in a first building than a second geo-fence in a second building, then it may be determined that the receiver is within the first building. Or, if the position estimate is approximately (e.g., within a few meters) the same distance away from the first geo-fence and the second geo-fence, then it may be determined that the receiver is in between those buildings (i.e., outside of those buildings). In this way, relative distances between two buildings can be determined.

In alternative embodiments, height envelopes of buildings (or accessible floors in buildings) may be compared to the estimated altitude of a receiver to determine if the receiver is inside or outside that building. For example, if two buildings are adjacent to each other, where a first building is shorter than the altitude, and a second building is taller than the altitude, it can be determined that the receiver is in the second building. By way of another example, if both buildings are taller than the altitude, but the altitude corresponds to an inaccessible area of the first building (e.g., a secure floor), it is determined that the receiver is in the second building.

By way of yet another example, an identifier received from a local area network associated with a particular venue (e.g., a coffee shop, a business, and the like) can be used to look up that network in a database, and then look up the building (or area of a building) that houses that venue. Similarly, an identifier received from a short-range communication link provided by a user device (e.g., a hot spot or other identifiable signal) can be used to look up that user device in a database, and then look up the building (or area of a building) where that user device is typically present, or identify where that user device is not typically present.

Historical locations of the receiver may be tracked and associated with particular buildings or heights in areas of a city. The historical locations can be used to determine how likely the current location of the receiver is in a particular building/area. For example, knowledge that a receiver is regularly located in a building on certain days and at certain times can be used to identify that building as the most-likely location of the receiver, from among other nearby locations. Movements among buildings can also be tracked and used to determine that the receiver has exited the building through a geo-fence. Additionally, knowledge of a user's calendared events may be correlated to buildings and times, and then used to determine whether the user is indoors or outdoors based on the location and time of the event.

The determinations may be performed on the remote server, on the receiver, or both. The response may be in some coded form that conveys one of the following relationships: "The position estimate (or actual location) is within a first building-address/name, confidence level"; "The position estimate (or actual location) is outside/near the first building address/name, confidence level"; and "The position estimate (or actual location) is in an adjacent building address/name, confidence level". The confidence levels may be related to the relative position/distance of the position estimate to the relevant pre-built geo-fence(s), such that a higher confidence level will be given when position/distance of the position estimate is within some maximum threshold distance from the pre-built geo-fence(s), or separated by some minimum threshold distance from the pre-built geo-fence(s).

It is noted that the above approaches can be similarly applied to estimating a floor or area, from among multiple floors or areas, at which a receiver likely resides.

Web-Based Services & Analytics Regarding Environmental and User Information

Web Service

Various embodiments operate in association with a multi-tier (e.g., 3-tier) cloud-based service. Other non-cloud based services may similarly be used. For example, one component of the cloud based service may include a data source (e.g., a building database or database of building information) built on a database software system such a as SQL-MySQL, NoSQL-Hadoop, or other technology. The data source may have a defined data structure/schema that identifies each building using, among other things, a building identifier, an address, latitude/longitude/altitude (LLA) coordinates, a LLA-based envelope of the building, or other unique identifier. The data may further identify the contents or other characteristics of each building—e.g., floors, venues within the building, atmospheric conditions on a per-time basis, and other contents or characteristics. Other components of the cloud based service may include: middle-ware business-logic implementation to manipulate the data in the building database and to monitor access to the web service; and front-end interfaces to interact with the building-database and the middle-ware business logic.

Data

The building database may store various types of data. For example, data may represent an indoor map of every floor of a building including any sub-structures or venues (e.g., stores within a mall, commercial or residence units in a high-rise building). The data may map (or otherwise associate) floor levels to altitudes, or ranges of altitudes that correspond to different floors of the building. For example, the value of the altitude may be based on either imperial or metric systems of measurement in either Height Above Ellipsoid (HAE) or Mean Sea Level (MSL) formats, or both.

The database may also store an RF-signature of every floor (or sections of each floor). The RF-signature can be obtained by either surveying the area of that floor (e.g., as shown in the building 190b of FIG. 1), or crowd-sourcing the RF signatures over a period of time. The RF-signature may characterize each available signal in that area based on detectable signal properties. For each area, the database may also store pseudoranges for each signal, signal-to-noise ratio or other indication of signal strength for each signal, and/or an indication that the signal is a multipath signal.

Data representing one or more pre-built 3D geo-fences for each building, floor or thing/place may be stored. Each geo-fence may be based on the geographic perimeter of the building, spaces within a building (e.g., store/shop within a mall, floor space), or proximity to a thing or place. For example, a geo-fence may designate a range of coordinates along the boundary of the geo-fence. In this manner, the geo-fences may be defined in three dimensions. A fourth dimension of time may also be used to indicate when a particular geo-fence changes one of its characteristics (e.g., for multipurpose areas, or areas that have scheduled changes to an associated characteristic like occupancy). With prebuilt geo-fences, whether a particular position coordinate (e.g., some or all of latitude, longitude, and altitude) falls within or outside of physical boundaries of a building, floor, or venue can be determined.

Accuracy of the data during collection or storage can be determined using various approaches (e.g., based on age, quality, relevance, correlation, and other considerations). For example, data may be tracked over time for changes, newly collected data may be correlated to stored data, the relevance or quality of data may be estimated and represented as a stored relevance or quality metric value, the age of data may be tracked and stored, or other analysis may be performed to evaluate the data before its use.

Of course, known mechanisms to add data to the database either manually or programmatically are contemplated.

Middleware

Middleware business logic may contain several features. For example, the middleware may have the ability to: process API requests from receivers; verify the Developer API Keys and take appropriate action if the key is valid or invalid; enforce business rules on usage of the API; and monitor the rate of usage of the database by the receiver on a per receiver, per developer, per user, or per key basis.

The middleware may also compare a position estimate corresponding to a receiver in the form of latitude, longitude, and latitude, or pseudo-ranges obtained from the receiver, against pre-built geo-fences to provide triggers such as "within a geo-fence", "outside-a-geo-fence", "number of times traversed a geo-fence", and others. The middleware may determine and provide such triggers to specify if an estimated position is within, outside and adjacent to a building. The middleware may include predictive software functions that can estimate error associated with an estimated position, any stored data or the estimated position's relationship to the stored data, and then assign a confidence to the presence of the receiver within a building or in a building adjacent to it.

The middleware may include filtering mechanisms to discount the presence of a device's estimated position within a building if the altitude component of consecutive estimates of the receiver's position is consistently (for a programmable period of time) at a height where the building has no floors, or where a user of the device is not authorized.

The middleware may include an ability to import altitude to floor-level data and store it into the building database. The middleware may further include an ability to reverse geo-code the floor-level of a building based on the altitude in either HAE or MSL formats.

Front End

Front-end interfaces of the building data web service may contain various features. For example, the front end may include: an admin console user interface (UI) and Admin-APIs with role-based access that allows the data in the building database to be manipulated; a set of defined API methods with requisite access restrictions via developer keys to allow customers/user to programmatically access the information contained in the building database or the results of the computation performed by the middleware business logic layer/engine; a customer account portal to allow the users/customer to manage their accounts, billing, rate limits and more; and other features.

Indoor Map

An indoor map web service may include a specialized interface into the building data web service that allows the entire or portions of an indoor map corresponding to a building or group of buildings to be made available on a web browser or other application (e.g., for E-911 dispatching, building management, enterprise mobility/service management). In some embodiments, an indoor map web service is integrated by a solutions provider for the various verticals such as E-911 consoles, building management software systems, receiver management systems, commercial LBS systems, independent developers and applications.

Analytics

A location analytics system may be configured to interface with the building data web service using its own multi-tier cloud server architecture. The location analytics system may contain various components, including: a location analytics database; middleware business logic; and front-end interfaces for interactions between users and the analytics system.

Data

The location analytics database may store different types of data, including: meta-data about the buildings in the building database including elements such as address, number of tenants in the building, tenant information, tenant category, building statistics and more; temporal data about buildings (e.g., such as events happening in a building, heat-mapping of building); spatial data (e.g., climate/weather, geographical location, season, demographic trend and more); pre-built path information (e.g., which may string together meta-data, temporal data and spatial data for a set of buildings with its associated geo-fences to create a "path" that represents a reference lifestyle for a user type); lifestyle profile data (e.g., specifying demographic or interest information about users like a relationship relative to other people like being a mom, an occupation or role like student or engineer, an age group like 20-something, a hobby or interest like being a sports fan or an outdoor enthusiast); user profile data (e.g., gender, age, friends, family); device characteristics (e.g., model, OS, operator); historical path information of individual assets/users with appropriate privacy protections and non-identifiable markers; historical location information about each device (e.g., based on the device's unique identifier); and others.

Middleware

The middleware business logic engine may implement several features, including: an ability to reverse geo-code locations within a building based on estimated positions obtained from a receiver using the location analytics database and the building database; and typecast/profile a user's behaviors based on their path information (e.g., where the user has traveled with the receiver) and comparing it to pre-built path-profiles and their own historical path information with built-in filtering to minimize variance. The typecast/profile of a user can be based on that user's estimated position (or set of estimated positions over time). It may be used for a variety of applications, such as an ability to connect with an advertisement network to obtain and target highly relevant and hyper-local mobile advertisements, where the level of relevance may be obtained by the combining or correlating location analytics (e.g., path/lifestyle profile, building meta data, user profile, device characteristics and more). A messaging platform may be used to convey an advertisement and other notifications to the user's receiver (e.g., pushed to a user based on user permissions).

Front End

The front-end interfaces of the building data web service may contain several features, including: an admin console UI and Admin-APIs with role based access that allows the data in the building database to be manipulated; a set of defined API methods with requisite access restrictions via developer keys to allow customers/user to programmatically access the information contained in the building database or the results of the computation performed by the middleware business logic layer/engine; a customer account portal to allow the users/customer to manage their accounts, billing, rate limits and more; and other features.

Example Methodologies

Functionality and operation disclosed herein may be embodied as one or more methods implemented by processor(s) at one or more locations. Non-transitory processor-readable media embodying program instructions adapted to be executed to implement the method(s) are also contemplated. The program instructions may be contained in at least one semiconductor chip. Methods of this disclosure may be implemented by hardware, firmware or software. One or more non-transitory processor-readable media embodying program instructions that, when executed by one or more processors, cause the one or more processors to perform or implement operations comprising the steps of any of the methods described herein are contemplated. As used herein, processor-readable media includes all forms of processor-readable media (e.g. non-volatile or volatile storage media, removable or non-removable media, integrated circuit media, magnetic storage media, optical storage media, or any other storage media) that may be patented under the laws of the jurisdiction in which this application is filed, but does not include processor-readable media that cannot be patented under the laws of the jurisdiction in which this application is filed. By way of example, a "processor" may include one or more computing device(s), processor(s), controller(s), integrated circuit(s), chip(s), system(s) on a chip, server(s), programmable logic device(s), other circuitry, and/or other suitable means described herein or otherwise known in the art. Systems that include one or more processors or the one or more non-transitory processor-readable media embodying program instructions that, when executed by the one or more processors, cause the one or more processors to perform or implement operations comprising the steps of any methods described herein are also contemplated.

By way of example, not by way of limitation, method(s) may comprise: identifying a plurality of estimated altitudes corresponding to a plurality of historical positions of the one or more receivers in a building; and identifying a height for each of a plurality floors in the building based on the plurality of estimated altitudes.

Method(s) may further or alternatively comprise: identifying a first set of estimated altitudes that are within a threshold amount of distance from each other; identifying a first height that corresponds to the first set of estimated altitudes; and mapping the first height to a first floor of the building. In accordance with some aspects, the first height is based on an average of each estimated altitude in the first set of altitudes. In accordance with some aspects, the threshold amount of distance is 1 meter.

Method(s) may further or alternatively comprise: identifying a second set of estimated altitudes, from the plurality of estimated altitudes, that are within the threshold amount of distance from each other; identifying a second height that corresponds to the second set of estimated altitudes; and mapping the second height to a second floor of the building.

Method(s) may further or alternatively comprise: identifying an additional set of estimated altitudes, from the plurality of estimated altitudes, that are within the threshold amount of distance from each other; identifying an additional height that corresponds to the additional set of estimated altitudes; and mapping the additional height to an additional floor of the building based on a first difference in height between the first height and the second height.

Method(s) may further or alternatively comprise: determining a second difference between the additional height and the first height; determining a ratio of the second difference to the first difference; identifying a floor number of the first floor; and determining a floor number of the additional floor based on the ratio. Method(s) may further or alternatively comprise: mapping an additional height to an additional floor of the building based on a difference in height between the first height and the second height. Method(s) may further or alternatively comprise: dividing the plurality of estimated altitudes into sets of estimated altitudes that are within the threshold amount of distance from each other; identifying a total number of the sets; and determining a minimum number of floors in the building based on a total number.

By way of example, not by way of limitation, method(s) may comprise: determining a first estimate of a receiver's position in three dimensions; comparing the first estimate of the receiver's position to a first geo-fence associated with a first building; determining, based on the comparison, a first relationship between the first estimated position and the first building, wherein the first relationship specifies whether the first estimated position is within the first building, outside of the first building, or within an adjacent building; and determining a confidence level related to the first relationship.

Method(s) may further or alternatively comprise: comparing the first estimate of the receiver's position to a second geo-fence associated with a second building; determining, based on the comparison, a second relationship between the first estimated position and the second building, wherein the second relationship specifies whether the first estimated position is within the second building, outside of the second building, within the first building, or within the adjacent building; and determining a confidence level related to the second relationship.

By way of example, not by way of limitation, method(s) may comprise: determining a first estimate of a receiver's position; setting the current position of the receiver as the first estimate of the receiver's position; determining a second estimate of the receiver's position; determining whether the second estimated position, relative to the first estimated position, indicates that the receiver has moved more than a threshold distance; after determining that the second estimated position, relative to the first estimated position, indicates that the receiver has moved more than a threshold distance, determining whether one or more sensors of the receiver indicate that the receiver actually moved more than the threshold distance; setting, based on determining that the one or more sensors of the receiver indicate that the receiver moved more than the threshold distance, the current position of the receiver as the second estimate of the receiver's position; and maintaining, based on determining that the one or more sensors of the receiver indicate that the receiver did not move more than the threshold distance, the current position of the receiver as the first estimate of the receiver's position.

By way of example, not by way of limitation, method(s) may comprise: determining a first estimate of a receiver's position; and disabling an application on the receiver based on a comparison of the first estimate of the receiver's position and a first set of three-dimensional position information corresponding to a first geo-fence inside a building. Method(s) may further or alternatively comprise: determining a second estimate of the receiver's position; and enabling the application on the receiver based on a comparison of the second estimate of the receiver's position and a second set of three-dimensional position information corresponding to a second geo-fence inside the building. In accordance with some aspects, the application is disabled to lower power consumption of the receiver. In accordance with some aspects, the application is disabled to prevent the receiver from accessing data from inside the building.

By way of example, not by way of limitation, system(s) for collecting and using data in association with three-dimensional estimates of position that correspond to one or more mobile user devices may comprise: at least one data source that stores data corresponding to one or more buildings, wherein the data corresponding to each of the one or more buildings specifies an identifier, an address, latitude, longitude, an altitude of each floor, and a map of each floor corresponding to that building; and one or more processors that access the data in association with one or more requests from one or more mobile user devices.

In accordance with some aspects, the one or more processors verify one or more developer keys associated with the one or more mobile user devices before giving the mobile user device access to at least some of the data. In accordance with some aspects, the one or more processors enforce a first set of business rules associated with a first request to use the data by a first mobile user device In accordance with some aspects, the one or more processors monitor a first rate of usage of the data by a first mobile user device. In accordance with some aspects, the first rate of usage pertains only to use of the data in association with a first key.

The processor(s) may: compare estimated latitude, longitude and altitude of a mobile user device to a three-dimensional geo-fence associated with a building; and determine, based on the comparison, whether the estimated latitude, longitude and altitude are within the three-dimensional geo-fence or outside of the three-dimensional geo-fence. The processor(s) may: compare estimated latitudes, longitudes and altitudes of a mobile user device during a time period to a three-dimensional geo-fence associated with a building; and determine, based on the comparison, a number of times the mobile user device traversed the geo-fence during the time period. The processor(s) may: determine whether estimated altitudes of a mobile user device exceeds a height of a building over a period of time; and discount the presence of the mobile user device in that building when the estimated altitudes exceed the height of the building over the period time. In accordance with some aspects, the one or more processors cause a map of a floor in a building to display on a first user device when an estimated altitude of a second user device correlates to the floor. In accordance with some aspects, the one or more processors geo-code a floor of a building using three-dimensional position estimates of mobile user devices.

In accordance with some aspects, the processors identify an advertisement to transmit to a mobile user device based on historical path data associated with the mobile user device. In accordance with some aspects, the data corresponding to the buildings specifies RF signature information for signals received from different transmitters at different floors. In accordance with some aspects, the data corresponding to at least one of the buildings specifies a geo-fence associated with a floor in that building. In accordance with some aspects, the geo-fence is defined by a three-dimensional boundary. In accordance with some aspects, the geo-fence is further defined by a first time period when the floor is used for a first purpose and a second time period when the floor is used for a second purpose. In accordance with some aspects, the data corresponding to each building specifies a quality metric value that represents estimated quality of at least some of the data. In accordance with some aspects, the data corresponding to each building specifies a relevance metric value that represents estimated relevance of at least some of the data. In accordance with some aspects, the data corresponding to at least one of the buildings specifies demographic or interest information associated with a mobile user device.

Any portion of the functionality embodied in the method(s) above may be combined with any other portion of that functionality. Systems that carry out functionality (e.g., embodied as methods) may include one or more devices, including transmitter(s) from which position information is sent, receiver(s) at which position information is received, processor(s)/server(s) used to compute a position of a receiver and carry out other functionality, input/output (I/O) device(s), data source(s) and/or other device(s). Outputs from a first device or group of devices may be received and used by another device during performance of methods. Accordingly, an output from one device may cause another device to perform a method even where the two devices are no co-located (e.g., a receiver in a network of transmitters and a server in another country). Additionally, one or more computers may programmed to carry out various methods, and instructions stored on one or more processor-readable media may be executed by a processor to perform various methods.

Example Systems & Other Aspects

Various techniques are used to estimate the position of an receiver, including trilateration, which is the process of using geometry to estimate a location of the receiver using distances (or "ranges") traveled by different "ranging" signals that are received by the receiver from different beacons (or antennas when using a multi-antenna configuration). If the time of transmission of a ranging signal from a transmitter and the reception time of the ranging signal are known, then the difference between those times multiplied by speed of light would provide an estimate of the distance traveled by that ranging signal. These estimates are often referred to as "range measurements". In most cases, the range measurements are not equal to the actual ranges (i.e., shortest distances) between transmitters and the receiver, mainly because signals reflect off of objects disposed between the transmitters and the receiver. Consequently, the estimate of the receiver's position is not necessarily equal to the actual position. It is noted that the term "GPS" may refer to any Global Navigation Satellite Systems (GNSS), such as GLONASS, Galileo, and Compass/Beidou, and vice versa.

The various illustrative systems, methods, logical features, blocks, modules, components, circuits, and algorithm steps described herein may be implemented, performed, or otherwise controlled by suitable hardware known or later developed in the art, or by firmware or software executed by processor(s), or any such combination of hardware, software and firmware. Systems may include one or more devices or means that implement the functionality (e.g., embodied as methods) described herein. For example, such devices or means may include processor(s) that, when executing instructions, perform any of the methods disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and receiver, and the like, may refer to devices that include a processor, or may be equivalent to the processor itself.

A "memory" may accessible by a processor such that the processor can read information from and/or write information to the memory. Memory may be integral with or separate from the processor. Instructions may reside in such memory (e.g., RAM, flash, ROM, EPROM, EEPROM, registers, disk storage), or any other form of storage medium. Memory may include a non-transitory processor-readable medium having processor-readable program code (e.g., instructions) embodied therein that is adapted to be executed to implement the various methods disclosed herein. Processor-readable media be any available storage media, including non-volatile media (e.g., optical, magnetic, semiconductor) and carrier waves that transfer data and instructions through wireless, optical, or wired signaling media over a network using network transfer protocols. Instructions embodied in software can be downloaded to reside on and operated from different platforms used by known operating systems. Instructions embodied in firmware can be contained in an integrated circuit or other suitable device. Data" and "information" may be used interchangeably. A data source which is depicted as a single storage device may be realized by multiple (e.g., distributed) storage devices. A data source may include one or more types of data sources, including hierarchical, network, relational, non-relational, object-oriented, or another type of data source. As used herein, processor-readable media includes all forms of processor-readable medium except, to the extent that such media is deemed to be non-statutory (e.g., transitory propagating signals).

Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source.

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The term "device" may comprise one or more components (e.g., a processor, a memory, a receiver, a screen, and others). The disclosure is not intended to be limited to the aspects shown herein but is to be accorded the widest scope understood by a skilled artisan, including equivalent systems and methods.

The invention claimed is:

1. A method for determining positions of receivers, the method comprising:
    determining a first estimate of a position at which a receiver was located at a first time;
    setting a current position of the receiver as the first estimate;
    determining a second estimate of a position at which the receiver was located at a second time;
    determining a difference in distance between the first estimate and the second estimate;
    estimating, using one or more sensors of the receiver, a distance moved by the receiver between the first time and the second time;
    determining if (i) the difference in distance between the first estimate and the second estimate and (ii) the estimated distance moved by the receiver between the first time and the second time meet a condition;
    based on determining that the condition is met, setting the current position of the receiver as the second estimate; and
    based on determining that the condition is not met, maintaining the current position of the receiver as the first estimate,
    wherein determining if (i) the difference in distance and (ii) the estimated distance moved by the receiver meet the condition comprises determining if (i) the difference in distance and (ii) the estimated distance moved by the receiver are within a predefined amount of distance from each other, wherein setting the current position of the receiver as the second estimate if the condition is met comprises using the second estimate as the current estimated position of the receiver if the difference in distance and the estimated distance moved by the receiver are within the predefined amount of distance from each other, and wherein maintaining the current position of the receiver as the first estimate if the condition is not met comprises maintaining the current position of the receiver as the first estimate if the difference in distance and the estimated distance moved by the receiver are not within the predefined amount of distance from each other.

2. The method of claim 1, wherein the method comprises:
determining that the difference in distance between the first estimate and the second estimate exceeds a threshold value of distance,
wherein the distance moved by the receiver is estimated in response to determining that the difference in distance between the first estimate and the second estimate exceeds the threshold value of distance.

3. A method for determining positions of receivers, the method comprising:
determining a first estimate of a position at which a receiver was located at a first time;
setting a current position of the receiver as the first estimate;
determining a second estimate of a position at which the receiver was located at a second time;
determining a difference in distance between the first estimate and the second estimate;
determining that the difference in distance between the first estimate and the second estimate exceeds a threshold value of distance;
estimating, using one or more sensors of the receiver, a distance moved by the receiver between the first time and the second time,
wherein the distance moved by the receiver is estimated in response to determining that the difference in distance between the first estimate and the second estimate exceeds the threshold value of distance;
determining if (i) the difference in distance between the first estimate and the second estimate and (ii) the estimated distance moved by the receiver between the first time and the second time meet a condition,
wherein determining if (i) the difference in distance and (ii) the estimated distance moved by the receiver meet the condition comprises determining if the estimated distance moved by the receiver exceeds the threshold value of distance;
based on determining that the condition is met, setting the current position of the receiver as the second estimate; and
based on determining that the condition is not met, maintaining the current position of the receiver as the first estimate,
wherein setting the current position of the receiver as the second estimate if the condition is met comprises using the second estimate as the current estimated position of the receiver if the estimated distance moved by the receiver exceeds the threshold value of distance, and
wherein maintaining the current position of the receiver as the first estimate if the condition is not met comprises maintaining the current position of the receiver as the first estimate if the estimated distance moved by the receiver does not exceed the threshold value of distance.

4. A method for determining positions of receivers, the method comprising:
determining a first estimate of a position at which a receiver was located at a first time;
setting a current position of the receiver as the first estimate;
determining a second estimate of a position at which the receiver was located at a second time;
determining a difference in distance between the first estimate and the second estimate;
determining that the difference in distance between the first estimate and the second estimate exceeds a threshold value of distance;
estimating, using one or more sensors of the receiver, a distance moved by the receiver between the first time and the second time,
wherein the distance moved by the receiver is estimated in response to determining that the difference in distance between the first estimate and the second estimate exceeds the threshold value of distance;
determining if (i) the difference in distance between the first estimate and the second estimate and (ii) the estimated distance moved by the receiver between the first time and the second time meet a condition;
based on determining that the condition is met, setting the current position of the receiver as the second estimate; and
based on determining that the condition is not met, maintaining the current position of the receiver as the first estimate, wherein the threshold value of distance is at least 5 meters.

5. One or more non-transitory processor-readable media embodying program instructions that, when executed by one or more processors, cause the one or more processors to implement a method for determining positions of receivers, the method comprising:
determining a first estimate of a position at which a receiver was located at a first time;
setting a current position of the receiver as the first estimate;
determining a second estimate of a position at which the receiver was located at a second time;
determining a difference in distance between the first estimate and the second estimate;
estimating, using one or more sensors of the receiver, a distance moved by the receiver between the first time and the second time;
determining if (i) the difference in distance between the first estimate and the second estimate and (ii) the estimated distance moved by the receiver between the first time and the second time meet a condition;
based on determining that the condition is met, setting the current position of the receiver as the second estimate; and
based on determining that the condition is not met, maintaining the current position of the receiver as the first estimate,
wherein determining if (i) the difference in distance and (ii) the estimated distance moved by the receiver meet the condition comprises determining if (i) the difference in distance and (ii) the estimated distance moved by the receiver are within a predefined amount of distance from each other, wherein setting the current position of the receiver as the second estimate if the condition is met comprises using the second estimate as the current estimated position of the receiver if the difference in distance and the estimated distance moved by the receiver are within the predefined amount of distance from each other, and wherein maintaining the current position of the receiver as the first estimate if the condition is not met comprises maintaining the current position of the receiver as the first estimate if the difference in distance and the estimated distance moved by the receiver are not within the predefined amount of distance from each other.

6. The one or more non-transitory processor-readable media of claim 5, wherein the method comprises:
   determining that the difference in distance between the first estimate and the second estimate exceeds a threshold value of distance,
   wherein the distance moved by the receiver is estimated in response to determining that the difference in distance between the first estimate and the second estimate exceeds the threshold value of distance.

7. One or more non-transitory processor-readable media embodying program instructions that, when executed by one or more processors, cause the one or more processors to implement a method for determining positions of receivers, the method comprising:
   determining a first estimate of a position at which a receiver was located at a first time;
   setting a current position of the receiver as the first estimate;
   determining a second estimate of a position at which the receiver was located at a second time;
   determining a difference in distance between the first estimate and the second estimate;
   determining that the difference in distance between the first estimate and the second estimate exceeds a threshold value of distance;
   estimating, using one or more sensors of the receiver, a distance moved by the receiver between the first time and the second time,
   wherein the distance moved by the receiver is estimated in response to determining that the difference in distance between the first estimate and the second estimate exceeds the threshold value of distance;
   determining if (i) the difference in distance between the first estimate and the second estimate and (ii) the estimated distance moved by the receiver between the first time and the second time meet a condition;
   wherein determining if (i) the difference in distance and (ii) the estimated distance moved by the receiver meet the condition comprises determining if the estimated distance moved by the receiver exceeds the threshold value of distance;
   based on determining that the condition is met, setting the current position of the receiver as the second estimate; and
   based on determining that the condition is not met, maintaining the current position of the receiver as the first estimate,
   wherein setting the current position of the receiver as the second estimate if the condition is met comprises using the second estimate as the current estimated position of the receiver if the estimated distance moved by the receiver exceeds the threshold value of distance, and
   wherein maintaining the current position of the receiver as the first estimate if the condition is not met comprises maintaining the current position of the receiver as the first estimate if the estimated distance moved by the receiver does not exceed the threshold value of distance.

8. One or more non-transitory processor-readable media embodying program instructions that, when executed by one or more processors, cause the one or more processors to implement a method for determining positions of receivers, the method comprising:
   determining a first estimate of a position at which a receiver was located at a first time;
   setting a current position of the receiver as the first estimate;
   determining a second estimate of a position at which the receiver was located at a second time;
   determining a difference in distance between the first estimate and the second estimate;
   determining that the difference in distance between the first estimate and the second estimate exceeds a threshold value of distance;
   estimating, using one or more sensors of the receiver, a distance moved by the receiver between the first time and the second time,
   wherein the distance moved by the receiver is estimated in response to determining that the difference in distance between the first estimate and the second estimate exceeds the threshold value of distance;
   determining if (i) the difference in distance between the first estimate and the second estimate and (ii) the estimated distance moved by the receiver between the first time and the second time meet a condition;
   based on determining that the condition is met, setting the current position of the receiver as the second estimate; and
   based on determining that the condition is not met, maintaining the current position of the receiver as the first estimate,
   wherein the threshold value of distance is at least 5 meters.

* * * * *